A. F. NELSON.
HOE.
APPLICATION FILED AUG. 30, 1915.
1,192,097.
Patented July 25, 1916.
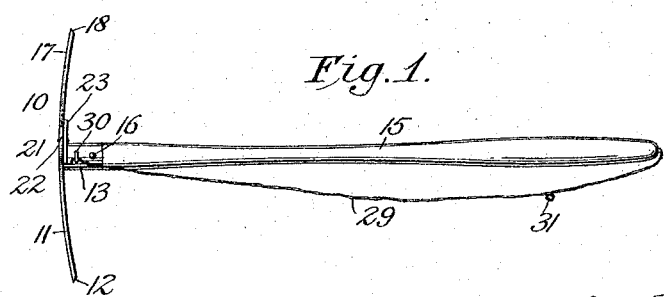
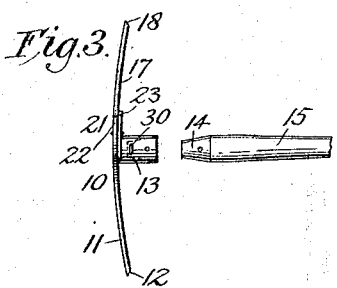
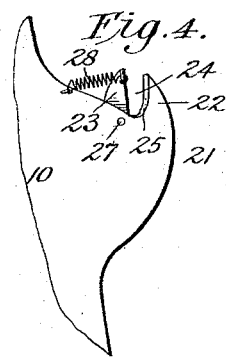
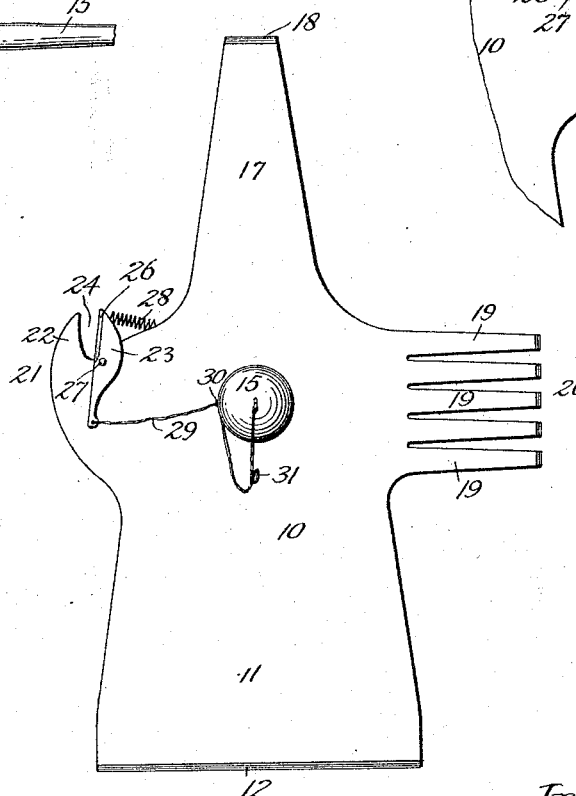
Inventor;
ARTHUR F. NELSON,
by
Attorneys.

UNITED STATES PATENT OFFICE.

ARTHUR F. NELSON, OF BAYFIELD, WISCONSIN.

HOE.

1,192,097.  Specification of Letters Patent.  Patented July 25, 1916.

Application filed August 30, 1915. Serial No. 48,114.

*To all whom it may concern:*

Be it known that I, ARTHUR F. NELSON, a citizen of the United States, residing at the city of Bayfield, in the county of Bayfield, State of Wisconsin, have invented a new and useful Hoe, of which the following is a specification.

This invention relates to an improved hoe for manual use in gardens and fields, and has for its object to provide in connection with a hoe blade a blade for cutting weeds close to the plants, a device for uprooting weeds, and a shearing device for clipping and pruning plants, trees and the like, all of said devices being integrally formed with the hoe blade and being brought successively into use by rotating the entire tool about the axis of its handle.

In the accompanying drawing—Figure 1 is a side elevation of the entire hoe; Fig. 2 is an inner face view of the hoe on an enlarged scale; Fig. 3 is a detail side view showing the manner of connecting the handle to the blade, and Fig. 4 is an enlarged detail view of the shearing blade viewed in a direction opposite Fig. 1.

The blade of the combined tool comprises a plate 10 which may be made of sheet metal, cut or stamped to the proper form, or of cast metal as desired. One side 11 of the blade 10 is relatively broad as shown and has its edge 12 straight and sharpened to serve as the hoe blade proper.

Projecting from the inner face of the blade 10, substantially in the center thereof, is a socket 13, having a tapered hole therein into which the tapered lower end 14 of the hoe handle 15 is seated, and secured therein by a transverse rivet 16.

The side of the plate 10 opposite the hoe blade 11 is of less width and its two lateral edges are preferably tapered to form a narrow weeding blade 17, the working edge 18 at its end being straight and sharpened to readily cut weeds close to the ground near the plants that are being worked.

At one side of the blade 10, about midway between the cutting edges 12 and 18 and projecting outwardly in the plane of said blade and integral therewith, are a number of tapered fingers 19 that collectively form a weed uprooting device 20. The fingers 19 are similar and have their narrow ends sharpened and all in the same line, the spaces between said fingers each tapering inwardly to an angular or slightly rounded apex whereby the weeds or their roots will become wedged therein and permit their easy withdrawal from the ground, the sharp edges of the fingers 19 serving to cut through adjacent weeds and prevent entanglement.

Opposite the weed uprooting device 20 is a cutting or pruning implement 21 comprising a fixed knife 22, a pivoted knife 23 and means for actuating the pivoted knife. The fixed knife 22 is in the form of an upstanding hook, integral with the blade 10 and separated therefrom by a downwardly projecting notch 24. The inner edge of the knife 22 is, by preference, slightly concave and beveled on its outer face as at 25, Fig. 4, to form a cutting edge. The pivoted knife 23 has a straight cutting edge 26 and oscillates on a rivet or other pivot 27 passing through the knife between its ends and secured to the blade 10. The cutting edges of the knives are normally held apart by means of a spring, here shown as a spiral spring 28 attached at one end to the upper end of the pivoted knife and at its other end to the body of the blade 10. A flat or any other form of spring may be employed for the purpose if desired. At the other end of the pivoted knife 23 a flexible wire or cord 29 is connected and passes inwardly to and through an eye 30 on the socket 13 and thence to the end of the handle 15 where it is attached. A ring 31 on the wire or cord near the upper end of the handle enables the operator to work the pivoted knife by inserting a finger in the ring.

The blade 10 may be flat or slightly curved as shown, the several integral parts thereof such as the blades 11 and 17, the uprooting fingers 20 and the fixed knife blade 22 lying in the plane of the blade, furthermore these several elements are not necessarily arranged as shown, as their positions may be transposed if found desirable.

I claim:—

1. A manual garden implement comprising a metal plate having tool elements formed on three sides and a hook-shaped shear blade on the fourth side, all of said elements being integral with the metal plate, a pivoted shear blade on the plate to coöperate with the hook-shaped shear blade, and means for operating the pivoted blade.

2. A manual garden implement comprising a metal plate with which are integrally formed a plurality of tools for working a garden and a hook serving as one blade of a cutting and pruning shears, a second shear blade pivotally mounted on the metal plate, means for normally holding the shear blades apart, and means for optionally closing them.

3. A manual garden implement comprising a metal plate, a socket projecting substantially from the center of one face of said plate, a handle seated at one end in said socket and fixedly secured therein, a plurality of tools for working a garden integral with said plate, and a hook serving as one blade of a cutting and pruning shears, a second blade pivotally mounted on the metal plate, a spring for normally holding said blades apart, and a flexible connection from the pivoted blade to the distant end of the handle for closing the blades.

4. A manual garden implement comprising a metal plate with which are integrally formed a plurality of tools for working a garden and a hook serving as one blade of a cutting and pruning shears, said tools projecting outwardly from the sides of the metal plate in the plane of the plate, a second shear blade pivotally mounted on the metal plate, and means for operating said blade.

ARTHUR F. NELSON.

Witnesses:
JACK C. NELSON,
JOHN J. FISHER.

Copies of this patent may be obtained for five cents each, by addressing the "Commissioner of Patents, Washington, D. C."